United States Patent [19]

Durling

[11] 4,302,057
[45] Nov. 24, 1981

[54] PNEUMATIC CONTROL VALVE

[75] Inventor: Harold Durling, Elsie, Mich.

[73] Assignee: Midland-Ross Corporation, Cleveland, Ohio

[21] Appl. No.: 107,703

[22] Filed: Dec. 27, 1979

[51] Int. Cl.³ .............................................. B60T 15/16
[52] U.S. Cl. ........................................... 303/7; 303/71
[58] Field of Search ........................... 303/7, 9, 68, 71; 137/624.18, 624.27, 625.12, 625.13

[56] References Cited

U.S. PATENT DOCUMENTS 3,781,065 12/1973 Kersting .................................. 303/9
3,929,381 12/1975 Durling ............................... 303/9 X
4,088,374 5/1978 Gute ....................................... 303/9

Primary Examiner—Duane A. Reger
Attorney, Agent, or Firm—Richard A. Negin

[57] ABSTRACT

The present invention is a pulse valve which imparts a force to a piston means for a limited duration of time or over a given distance. This pulse valve can be incorporated into a manual control valve. The manual control valve is particularly useful in an air parking brake control system for an air parking brake system.

47 Claims, 8 Drawing Figures

PNEUMATIC CONTROL VALVE

BACKGROUND OF THE INVENTION

The present invention is in the field of air control valves; more particularly, the invention relates to an air control valve for use in a tractor-trailer air brake system.

Tractor-trailer rigs are equipped with air activated brake systems which incorporate structural features enabling them to meet requirements of the government and the trade. Federal Motor Vehicle Safety Standard (FMVSS) No. 121 makes two broad requirements affecting the use of valves to control tractor-trailer air brake systems. The first requirement, Section 5.1.3- Towing Vehicle Protection System, states: "If the vehicle is intended to tow another vehicle equipped with air brakes, a system to protect the air pressure in the towing vehicle from the effects of a loss of air pressure in the towed vehicle." The second requirement, Section 5.6.4- Parking Brake Control—Trucks and Buses, states, "The parking brake control shall be separate from the service brake control. It shall be operable by a person seated in the normal driving position. The control shall be identified in a manner that specifies the method of control operation. The parking brake control shall control the parking brakes of the vehicle and of any air braked vehicle that it is designed to tow." FMVSS-121 also requires that the tractor and trailer parking brakes must apply when the tractor-trailer park control valve (hereinafter PV) is set when parking the rig.

In summary, when an air parking brake control system is used, the parking brake control must be separate from the service brake control. The parking brake control must control the parking brakes of the towing vehicle and any vehicle which is being towed. The air pressure in the towing vehicle must be protected from a loss of air pressure in the towed vehicle.

Prior art systems have been developed and are in use which comply with these federal requirements. Generally, the systems use three control valves which are interconnected in the air system. Pressure in the system releases the braking actuators, releasing the brakes. Example systems are described in U.S. Pat. Nos. 4,088,374 and 3,929,381. As stated above, there must be a PV to apply the tractor and trailer brakes.

A second valve used to meet the above requirements is a tractor protection control valve (hereinafter known as TPCV) which plugs the tractor system from leakage through the trailer connections during bobtail tractor operation, or when the tractor to trailer air line ruptures.

Initially, only the PV and TPCV were used to conform to the regulations. A rig having only a TPCV and PV would roll freely if parked on an incline when an attempt was made to pressurize the trailer system. It was found during pressurizing that all the brakes of the rig were released at an intermediate pressure and, unless the operator was in the seat ready to use pedal control, the rig was free to roll. At this stage of development, a tractor only park valve (hereinafter a TOPV) was designed and incorporated into the system so that the trailer air system could be filled while the tractor brakes were securely set during the pressurizing operation. A truck operator now has mounted within easy reach, three valves consisting of a TPCV, a PV and a TOPV.

The three valves presently used to accomplish the federally required air parking braking operation result in a complicated system. Because of this complicated parking brake operation, drivers ignore it or operate it incorrectly. It is desirable to provide an air brake operating system meeting all of the federal requirements which is simpler to operate. Further, it is desirable to develop a valve which can accomplish simple operation of the air braking system which itself is simpler to operate and easier to construct.

SUMMARY OF THE INVENTION

The present invention is a pulse valve which can be incorporated into an improved TPCV for use in a tractor-trailer air brake system.

The pulse valve of the present invention is a piston means located within a sealed chamber in a housing. A portion of the piston means slidingly passes through a piston opening in the housing. Within the chamber, the piston means has an extension from the piston sidewall toward the chamber sidewall, there being a predetermined clearance area between the chamber sidewall and the extension. The extension divides the chamber into a front chamber and a back chamber. There is an inlet into the chamber. By sizing the clearance between the extension and the chamber sidewall, a pressure difference created between the front chamber and the rear chamber causes the piston to move in a direction to equalize the pressure in the chambers. The piston moves in a direction for a predetermined duration of time depending on the size of the clearance through which the pressure between the front chamber and back chamber is equalized.

A manual control valve, which can be used as a TPCV, uses this pulse valve. The manual control valve has a housing having a front portion and a pulse portion. There is a control chamber in the housing between the front portion and the pulse portion. The front portion of the housing has a front inlet and a front outlet. The front inlet and outlet communicate with the control chamber. There is a back port from the pulse portion of the housing communicating with the control chamber. A shaft passes through the front portion of the housing. The front end of the shaft is connected to a manual activation means and the back end passes into the control chamber. A back valve seat is located between the back outlet port and the control chamber and a front valve seat is located between the front inlet port and the control chamber. A valve seating means is connected to the end of the shaft within the control chamber whereby the shaft can move toward the front until the valve seating means seats on the front valve seat and prevents communication between the front inlet port with the control chamber. The shaft can move toward the pulse portion until the valve seating means seats on the back valve seat and prevents communication between the back port and the control chamber.

The above described valve can be used as a TPCV in an air parking brake system with a PV valve to meet the federal requirements. Using this valve eliminates the necessity of a TOPV and provides an air parking system with only two control valves for the operator to use, the PV and TPCV of the present invention.

It is an object of the present invention to provide a new and unique pulse valve. It is an object of the present invention to use the pulse valve in a TPCV. It is another object of the invention to provide a TPCV which is less complicated than TPCVs used in the art.

It is an object of the present invention to provide a tractor-trailer air parking brake system which is simple to operate. It is another object of the invention to provide a TPCV which can be used in a simplified air parking brake system. It is another object of the present invention to provide an air parking brake system with only two valves for easier operation and taking up less space on a motor vehicle dashboard. More particularly, it is an object of the present invention to replace the TPCV and TOPV valves which are presently used in tractor-trailer air brake systems with the improved TPCV valve of the present invention.

It is an object of this invention to obtain one or more of the objects set forth above. These and other objects and advantages of this invention will become apparent to those skilled in the art from the following specification and claims, reference being had to the attached drawings.

BRIEF DESCRIPTION OF THE DRAWINGS

Corresponding elements in different drawings have the same reference characters.

DESCRIPTION OF THE PREFERRED EMBODIMENTS

Figure 3:
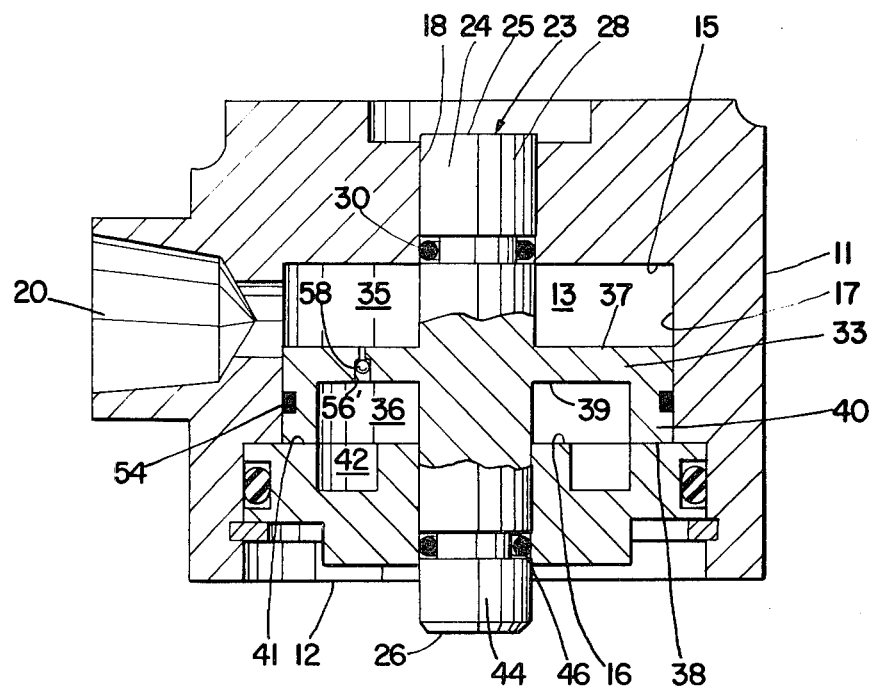
FIG. 3 is a sectional view of an alternate embodiment of the pulse valve shown in FIG. 1.
Figure 4:
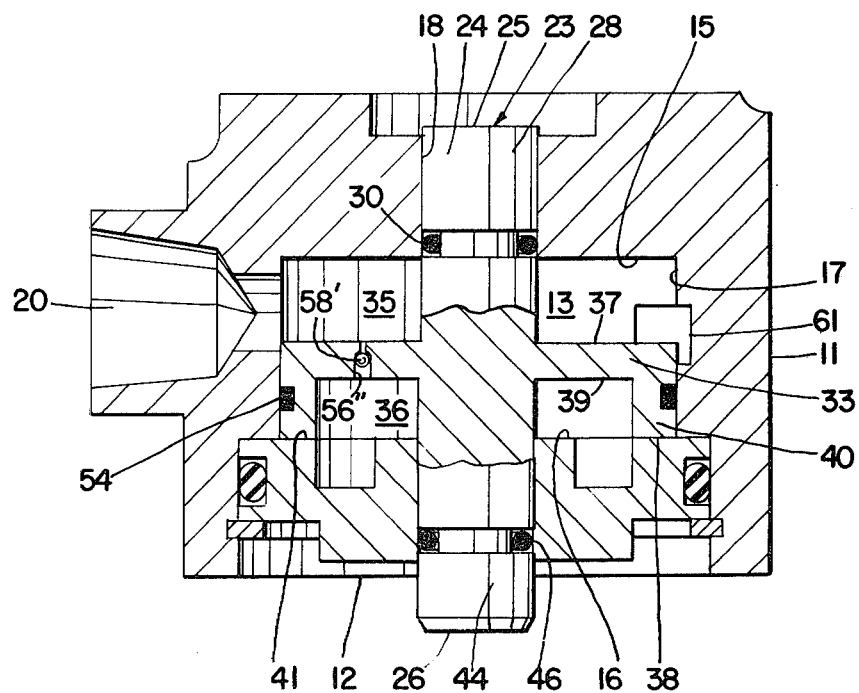
FIG. 4 is a sectional view of an alternate embodiment of the pulse valve shown in FIG. 1 containing a pulse through a given distance feature.
Figure 5:
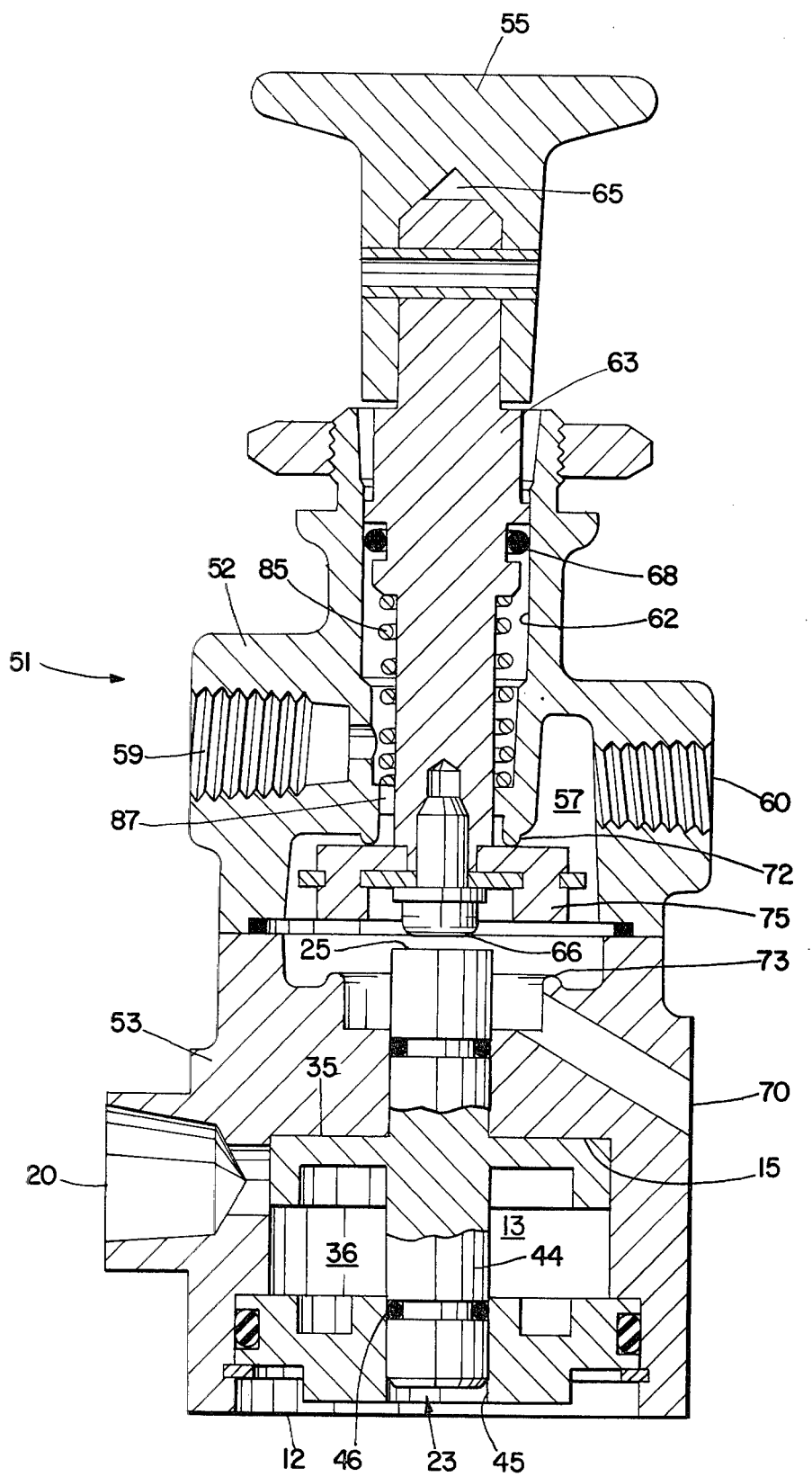
FIG. 5 is a sectional view of the TPCV of the present invention with the shaft in an out position.
Figure 6:
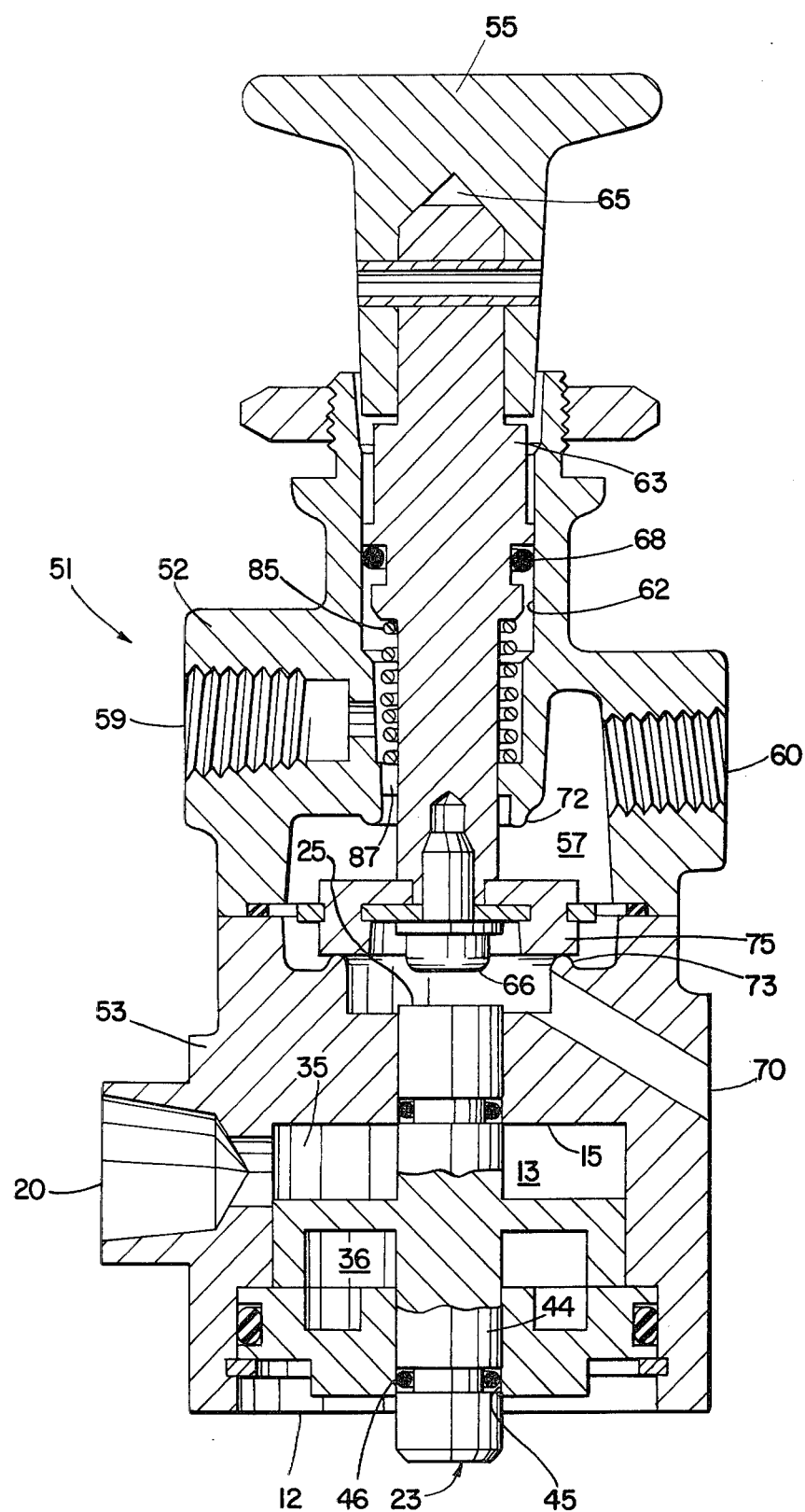
FIG. 6 is a sectional view of the TPCV with the shaft in an in position.
Figure 7:
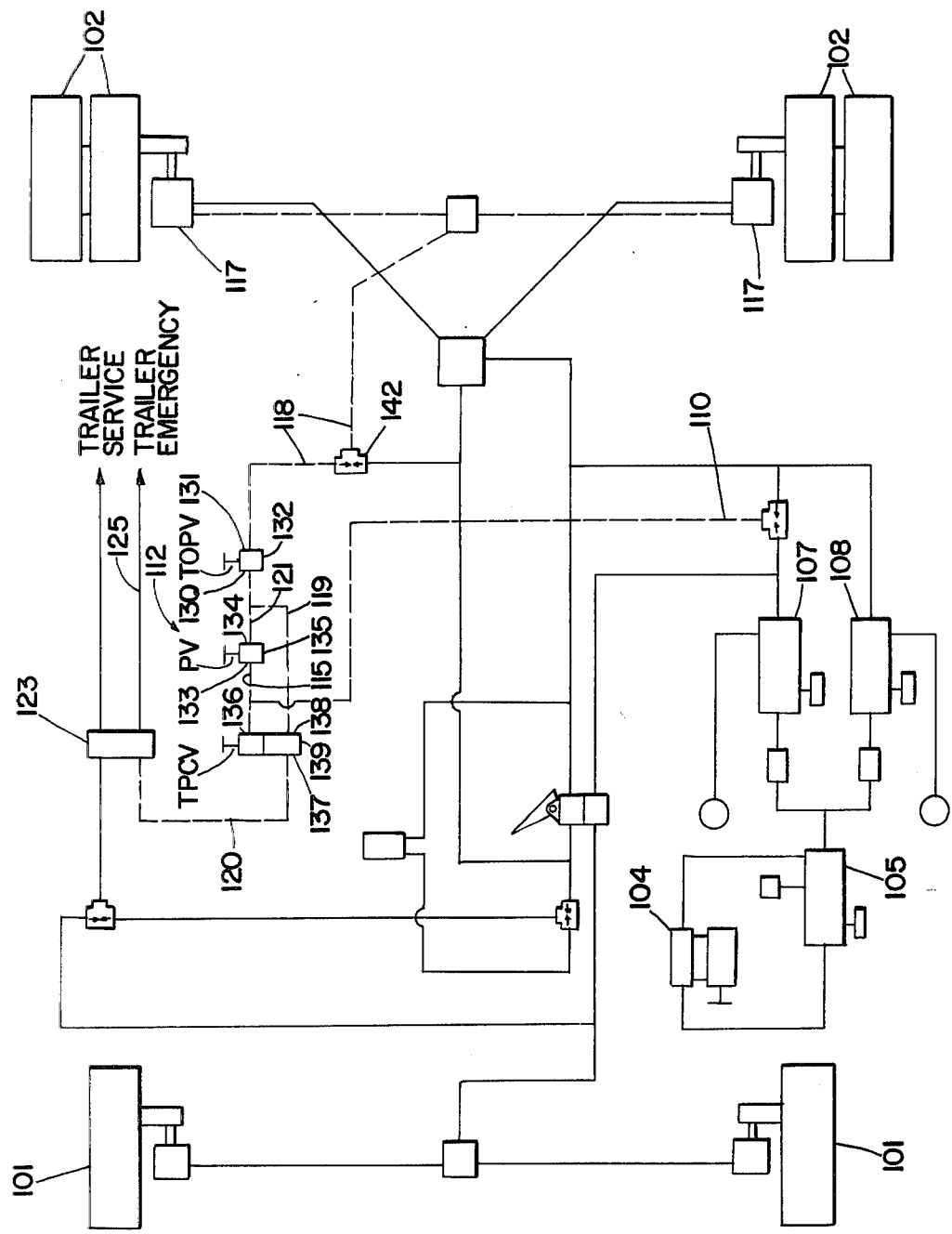
FIG. 7 is a schematic diagram of a prior art air parking brake system.
Figure 8:
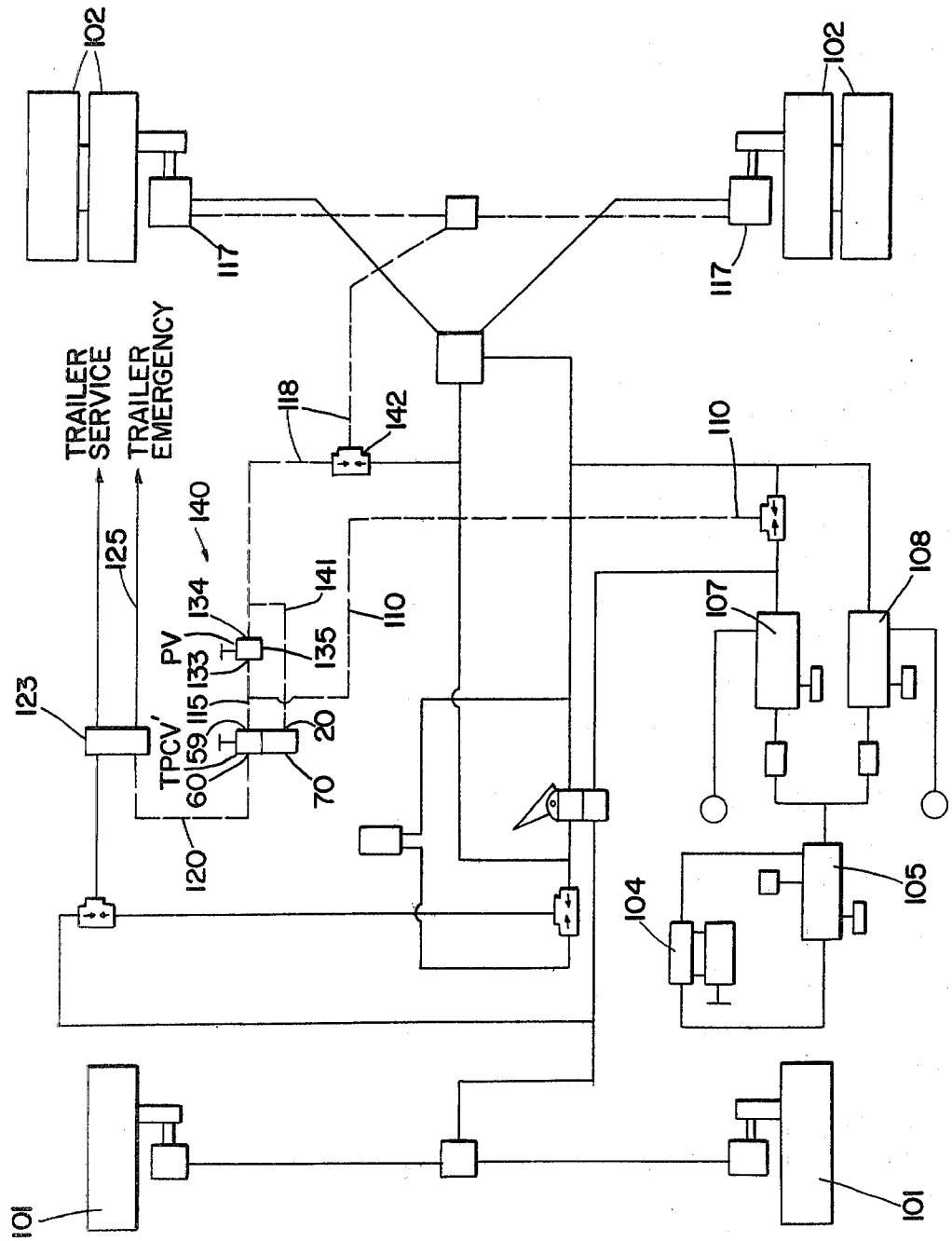
FIG. 8 is a schematic diagram of the air parking brake system of the present invention.

The present invention will be understood by those skilled in the art by reference to FIGS. 1 through 4 which are schematic drawings of embodiments of the pulse valve of the present invention, FIGS. 5 and 6 which are schematic drawings of the pulse valve used in the TPCV of the present invention, and FIGS. 7 and 8 which are diagrams of air parking systems of the prior art and the present invention.

Figure 1:
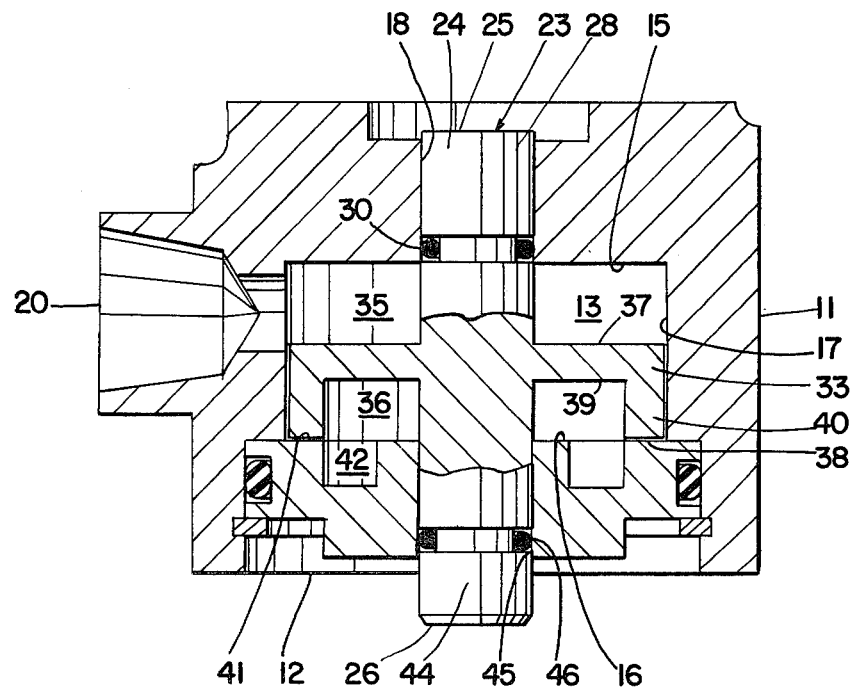
FIG. 1 is a sectional view of the pulse valve of the present invention.

The basic pulse valve is shown in FIG. 1. There is a pulse housing 11 having a pulse chamber 13 which can be sealed from the atmosphere. The pulse chamber has a front 15, a back 16 and a sidewall 17. Preferably, the sidewall 17 is cylindrical in shape although other shapes can be used. The housing 11 has at least one piston opening 18 and an inlet 20.

There is a piston means 23 having a piston portion 24 slidingly passing through piston opening 18. The piston portion 24 has a front end 25 and a back end 26. The piston portion 24 preferably has a cylindrical sidewall 28 although it can have other shaped sidewalls. The piston opening 18 is shaped to slidingly receive piston portion 24. There can be a means to seal such as O-ring 30 between the sidewall 28 of the piston portion and the piston opening 18. FIG. 1 shows the sealing means as O-ring 30 in an annular channel in the piston sidewall.

Alternatively, a labyrinth seal can be used. In certain uses no seal at all is necessary.

The piston means 23 has an extension 33 which is connected to the piston sidewall 28 within chamber 13 and extends toward pulse chamber sidewall 17. The extension 33 has a front face 37 and a back face 39. Preferably, the chamber sidewall 17 is a cylindrical wall and the piston extension 33 is cylindrical in cross section and coaxial with the piston portion 24 and with a cylindrical piston opening 18. The piston chamber 13 has a diameter which is greater than the diameter of the extension 33 so that the extension can slide within the chamber 13 as the piston portion 24 slides within the piston opening 18. There is a predetermined clearance area between the chamber sidewall 17 and the extension 33. The chamber is divided by the extension 33 into a front chamber 35 and a back chamber 36.

The extension 33 can be located anywhere along the piston portion 24 so long as the front end 25 at least passes into piston opening 18. In the embodiment shown in FIG. 2, the extension 33 is located at piston portion back end 26. Extension 33 can have a lip 40 protruding toward the back end 16 of pulse chamber 13. The lip 40 has a diameter no greater than that of the extension. The lip 40 has a lip back face 38. The total area of the back face is equal to the extension back face 39 plus the lip back face 38.

In the embodiment shown in FIG. 1, there is a back end extension 44 of piston portion 24 sealingly passing through back end extension opening 45. A sealing means such as O-ring 46 can be located between back end piston extension 44 and back end piston extension opening 45. The extension 33 is located along the piston portion 24 within pulse chamber 13. The piston portion 24 is longer than the distance from the front 15 to the back 16 of pulse chamber 13. The extension is located so that whether the piston means 23 slides toward the front 15 until the extension front face 37 intersects with the front 15, or the piston means slides toward the back 16 until the lip back face 38 intersects with the back 16, the front end 25 of piston portion 24 is located in piston opening 18 and back end 26 of piston extension 44 is located in piston extension opening 45.

The inlet 20 can be located anywhere in pulse housing 11. In the embodiment of FIG. 1, the inlet 20 is located above the extension 33 when the piston means is located so that lip back face 38 intersects the back of the pulse chamber 13. There can be auxiliary front and back chambers. An auxiliary back chamber 42 is shown located within the back of the housing and communicating with the back chamber 36. There is a means to prevent the extension from sliding into the auxiliary back chamber such as surface 41. There can similarly be auxiliary front chambers in the front end of the pulse housing. In this way, there can be a chamber in front or back of the extension whether the extension is intercepting the front end or the back end of the housing. Further, the auxiliary chambers can increase the volume in front and in back of extension 33 to control pulse duration.

Figure 2:
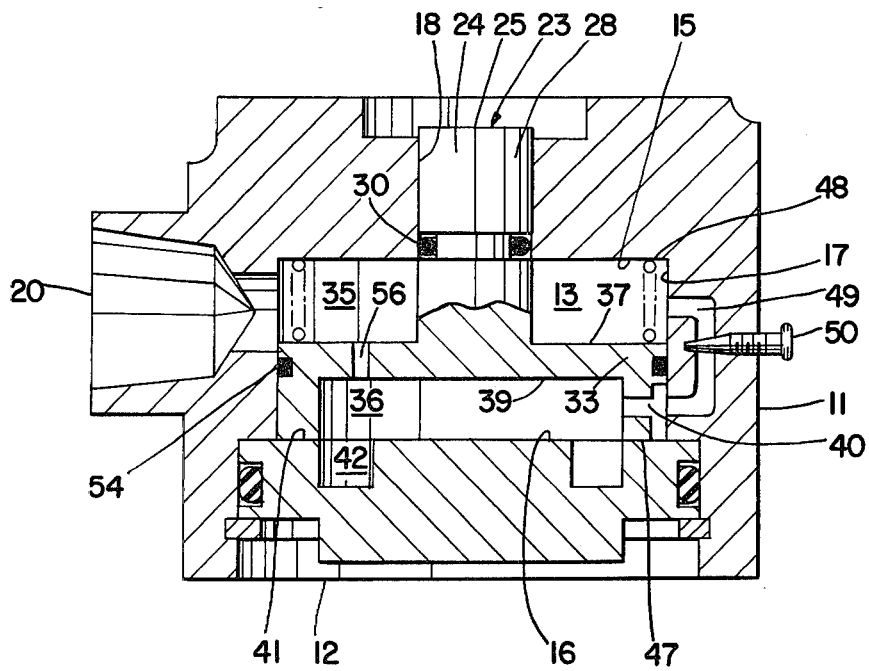
FIG. 2 is a sectional view of an alternate embodiment of the pulse valve shown in FIG. 1 containing optional features.

In its most basic form, the operation of the pulse valve is caused by a pressure difference between the front chamber 35 and the back chamber 36. In the embodiment shown in FIG. 1, this can occur when there is a decrease of pressure through inlet 20. When the valve is held vertically, the piston means 23 slides toward the back end 16 of the pulse chamber 13 by the force of gravity. Of course, there can be any suitable means to bias piston means 23 toward the front or the back of the pulse chamber. Alternatively, no biasing force is necessary since, after the pulse, the piston portion 24 can have no forces acting upon it. A decrease in pressure through inlet 20 results in front chamber 35 immediately having a lower pressure than back chamber 36. The higher pressure in back chamber 36 forces the piston means toward the front of housing 11. The front end 25 of the piston means 23 thereby moves in a forward direction. When the pressure in back chamber 36 becomes equal to the pressure from inlet 20 through the clearance space between extension 33 and piston chamber sidewall 17, the piston once again moves in the direction to which it is biased. In the embodiment shown in FIG. 1, there is no auxiliary front chamber. However, even when the piston means 23 is located toward the front end 15, inlet 20 opens to the clearance between extension 33 and sidewall 17 so that there is communication between the low pressure inlet 20 and the back chamber 36. The clearance space can be designed to control the duration of force acting on the piston. As shown in FIGS. 2 and 3, the clearance, or passage between the front and back chambers, can be regulated to control the duration of force acting on the piston means.

In the embodiment shown in FIG. 1, back end extension 44 helps to maintain the alignment and stability of piston means 23. More importantly, it equalizes the front and back areas of extension 33. This is important so that after a pulse the pressure in the front chamber 35 and back chamber 36 results in equal and opposite forces on extension 33. In this way, the pulse valve can only be affected by external pressure differences through inlet 20 or a difference in pressures to which front end 25 and back end 26 are exposed. The forces on front end 25 and back end 26 are expected to be equal or at least known and considered.

An alternate embodiment of the pulse valve of the present invention is shown in FIG. 2. In this embodiment, there is no back end extension. The total area of the extension back face 39 and lip back face 38 is now greater than the area of extension front face 37. A pressure difference between pulse chamber 13 and the space into which front end 25 protrudes affects the position of the piston means 23 due to the force difference on the front and back of the extension. Therefore, there is a biasing means to compensate for the area difference in the expected pressure environment such as spring 48.

In an alternate embodiment, as shown in FIG. 2, there can be a means to control the clearance area between the front chamber 35 and back chamber 36 in addition to or in place of the clearance area between the extension 33 and the chamber sidewall 17. One way to do this is to have an external passage, through the housing 11 such as channel 49, between the front chamber 35 and the back chamber 36. There can be a means to control the amount the passage is opened or closed. One means to have a control passage between the front chamber 35 and back chamber 36 is to have a passage through the housing 11 from the front chamber 35 to the back chamber 36 controlled by a valve such as a needle valve 50. In this way, the duration of time between equalization of pressure between the front chamber 35 and the back chamber 36 can be controlled. The use of an external passage can be used with any of the embodiments in FIGS. 1 through 4.

When using an external passage as the clearance area, front chamber 35 can be sealed from back chamber 36 by a sealing means such as O-ring 54. In this way, communication between the chambers is only through channel 49. This has the advantage of having a more precise passage area since there is greater machining tolerance to attain a clearance between extension 33 and sidewall 17 than in a passage 49. One reason for this is that the walls of passage 49 have a smaller cross-sectional perimeter than the perimeter of extension 33 and sidewall 17 which bound the clearance.

Referring to FIG. 2, there can be a hole 56 of a predetermined size between front chamber 35 and back chamber 36 in extension 33. This hole 56 can be used in place of or in addition to other passages or clearances communicating between the front and back chambers. This hole 56, as with channel 49, has less tolerance, and is therefore more precise, than the clearance area between extension 33 and sidewall 17.

Referring to FIG. 3, there can be an imperfect or leaky check valve 58 in hole 56'. When the check valve 58 is used, it is preferred to use seal 54 between the extension 33 and housing sidewall 17. Check valve 58 allows flow from the front chamber 35 to the back chamber 36 but only a controlled limited flow from back chamber 36 to front chamber 35. By controlling the flow from the back chamber 36, the duration of a pressure difference between the front chamber 35 and back chamber 36 operating on extension 33 can be controlled. When the pressure in the front chamber 35 is greater or equal to the pressure in the back chamber 36, check valve 58 opens. The inventor prefers to use this imperfect check valve 58 in hole 56' as a passage in the pulse valve.

An alternate embodiment for providing a pulse force during the movement of piston means 23 through a given distance is shown in FIG. 4. There is a notch 61 or an annular channel in the sidewall 17. This notch is used with check valve 58' in hole 56''. In this embodiment, check valve 58' only allows flow from the front chamber to the back chamber and prevents flow altogether when the pressure in back chamber 36 is greater than in front chamber 35. There is a sealing means such as O-ring 54 in an annular channel in the outer diameter of extension 33 which provides a seal between front chamber 35 and back chamber 36. There is also a clearance between extension 33 and sidewall 17 and at a predetermined distance from the front of the pulse chamber. When the pressure in back chamber 36 is greater than the pressure in front chamber 35, check valve 58' closes and piston means 23 moves toward the front 15. The piston means continues to move until notch 61 laps the seal 54 resulting in a passage between the front chamber 35 and the back chamber 36 through notch 61. The pressures equalize between the front and back chambers and there is no longer a force on the piston means 23 resulting from a pressure difference across extension 33.

A pulse valve shown in FIGS. 1, 2 and 3 can be incorporated into a manual control valve 51 which can be used as a TPCV. The embodiment of the pulse valve portion shown in FIG. 1 is used in FIGS. 5 and 6 to illustrate the manual control valve 51. Corresponding elements of the pulse valve in FIGS. 5 and 6 have corresponding reference characters with the pulse valve as shown in FIG. 1. The manual control valve 51 has a housing with a front portion 52 and a pulse portion 53. There is a manual activation means such as knob 55 by which the control valve 51 can be manually operated. A control chamber 57 is in the housing between the front portion 52 and the pulse portion 53. A front inlet port 59 into the front portion 52 of the housing communicates with control chamber 57 and a front outlet port 60 from the front portion 52 of the housing also communicates with control chamber 57. Back port 70 from the pulse portion 53 of the housing communicates with the control chamber 57. When the manual control valve is used as a TPCV, back port 70 is an exhaust port.

Shaft bore 62 is located within the front portion 52 of the housing and passes through the front portion 52 to the control chamber 57. Shaft 63 is slidingly located within the shaft bore 62. The shaft 63 has a front end 65 and a back end 66. The front end 65 is operatively connected to the knob 55 and the back end 66 passes into control chamber 57. There is a sealing means such as O-ring 68 between the shaft 63 and the shaft bore 62. The sealing means seals the control chamber 57 to prevent leakage from control valve 51 through shaft bore 62.

A front valve seat means such as front valve seat 72 is located between the front inlet port 59 and the control chamber 57 and a back valve seat means such as back valve seat 73 is located between the back port 70 and the control chamber 57. A valve seating means such as valve seat 75 is connected to the shaft 63 within the control chamber 57. The shaft 63 can move out of the front portion 52 of the housing until the valve seat 75 seats on front valve seat 72 and thereby prevents communication between the front inlet port 59 and the control chamber 57 as shown in FIG. 5. The shaft 63 can move toward the pulse portion 53 until the valve seat 75 seats on the back valve seat 73 and prevents communication between the back port 70 and the control chamber 57 as shown in FIG. 6. There can be a means to bias shaft 63 toward the front of front portion 52 of the housing. Preferably, the biasing means is a spring 85 which forces the shaft 63 toward the front of front portion 52 of the housing when the pressure of fluid through front inlet port 59 to control chamber 57 decreases below a predetermined value.

The manual control valve as described operates so that when knob 55 is pressed in, there is an open passage from front inlet port 59, through control chamber 57 and then to front outlet port 60 as shown in FIG. 6. In the embodiment shown, there is a passage from front inlet port 59, to annular channel 87, past front valve seat 72, through control chamber 57 and out of front outlet port 60. When there is sufficient fluid pressure from inlet 59 acting in chamber 57, the valve seat 75 remains seated against back valve seat 73. This is because the cross-sectional area of bore 62 is less than the area within back valve seat 73 which is covered by valve seat 75. The constant pressure acting on these two areas results in a net force closing valve seat 75 against back valve seat 73. Spring 85 is biased to force valve seat 75 off of back valve seat 73. The dimensions of the area of bore 62 and an area covered by valve seat 75 as well as the spring force can be varied so that the valve seat 75 can pop off of back valve seat 73 when the pressure in control chamber 57 is below a predetermined value.

Although it is not necessary to bias piston means 23, it can be biased toward the back of pulse chamber 13 by a suitable means such as gravity. A biasing force is not necessary in manual control valve 51 because, when the pressures in front chamber 35 and back chmber 36 are equal, the piston means 23 floats freely. Should there be a decrease in the pressure of front chamber 35 through inlet 20, piston means 23 moves toward the front 15 of pulse chamber 13. The front end 25 of piston means 23 makes contact with the back end 66 of shaft 63 forcing the shaft toward the front end of the front portion 52 of the housing, i.e., the knob is forced out, as shown in FIG. 5. Front outlet port 60 is then in communication with back port 70 which is an exhaust port when this valve is used as a TPCV.

The manual control valve as shown in FIGS. 5 and 6 can be used as a TPCV. The TPCV valve of the present invention can be used in an air parking brake control system for an air brake system. In order to understand the air parking brake control system of the present invention, reference is first made to FIG. 7 which is a schematic diagram of a prior art air parking brake system.

The tractor-trailer air parking brake system operates so that when air pressure is applied, there is no parking brake application. The tractor shown has two front wheels 101 and four rear wheels 102. The solid lines show the regular service braking system for the tractor. The dotted lines show the air line connections for the air parking brake system. There is a suitable means to supply compressed air such as air compressor 104 which supplies air to a supply reservoir 105. Supply reservoir 105 supplies service reservoirs 107 and 108. Service reservoirs 107 and 108 supply air parking brake system line 110 with air at a predetermined pressure.

Air parking brake supply line 110 feeds air to an air parking brake control system 112 comprising a set of valves which accomplish the various braking modes required by the federal regulations discussed in the Background. The control valve system must have a separate parking brake control means to control the parking brakes of the vehicle and of any air brake vehicle that it is designed to tow. Tractor-trailer control parking valve, PV, is used to accomplish this function. There must be a control means to prevent leakage through the trailer connection during bobtail operation or rupture of the tractor-trailer air line. In the prior art, a TPCV is used with tractor protection valve 123. As noted in the Background, it is necessary to have a means to maintain the brakes in the tractor while the braking system in the trailer is being pressurized. In the prior art, this is accomplished by a TOPV.

As shown in FIG. 7, line 110 is connected to control system line 115 between the TPCV and the PV. The TOPV is connected to the PV by line 121 which is on the opposite side of the PV from the TPCV. The TOPV communicates through air pressure lines generally shown as brake line 118, to tractor pneumatic brake actuators 117. Return line 119 connects line 121 between PV and TOPV to the TPCV. There is a trailer line 120 from the TPCV to tractor protection valve 123 and finally line 125 from tractor protection valve 123 communicates to trailer pneumatic brake actuators.

TABLE I

| | TPCV | PV | TOPV | TRACTOR PARK BRAKES | TRAILER EMERGENCY LINE |
|---|---|---|---|---|---|
| Tractor & trailer operating on highway | In | In | In | Pressurized | Pressurized |

TABLE I-continued

|  | TPCV | PV | TOPV | TRACTOR PARK BRAKES | TRAILER EMERGENCY LINE |
|---|---|---|---|---|---|
| Tractor & trailer parked | In or Out | Out | In or Out | Vented | Vented |
| Tractor parked - trailer system filling with air | In | In | Out | Vented | Pressurized |
| Tractor bobtail on highway | Out | In | In | Pressurized | Vented |
| Tractor bobtail - parked | Out | In or Out | Out | Vented | Vented |

TABLE II

|  | TPCV' | PV | TRACTOR PARK BRAKES | TRAILER EMERGENCY LINE |
|---|---|---|---|---|
| Tractor & trailer operating on highway | In | In | Pressurized | Pressurized |
| Tractor & trailer parked | Out* | Out | Vented | Vented |
| Tractor parked - trailer system filling with air | In | Out | Vented | Pressurized |
| Tractor bobtail on highway | Out | In | Pressurized | Vented |
| Tractor bobtail - parked | Out | Out | Vented | Vented |

*TPCV control pops out automatically when park control is pulled out.

Tables I and II summarize the operation of the prior art control system and the control system of the present invention respectively. Before discussing the various modes of operation of the prior art system indicated in Table I, it will be helpful to review the operation of the PV, the TOPV and the TPCV. All the valves can be hand actuated by moving an actuating knob on the valve which causes a stem to move to an in or out position. PV inlet port 133 is connected to control system line 115, outlet port 134 is connected to line 121, and there is an exhaust port 135. Pushing the activation knob in closes exhaust port 135 and opens ports 133 and 134 which communicate with each other and allow air to move from control system line 115 to line 121 unimpeded. Pulling out the activation knob closes port 133 and opens exhaust port 135 in communication with opened port 134.

TOPV operates similarly to the PV valve and is located between line 121 and brake line 118. TOPV port 130 is connected to line 121, port 131 is connected to brake line 118 and there is an exhaust port 132. Pushing the hand activation knob in closes exhaust port 132 and opens ports 130 and 131 which communicate with each other and allow air to move from line 121 to brake line 118 unimpeded. Pulling out the hand activation knob of the TOPV closes port 130 and opens exhaust port 132 in communication with opened port 131.

The TPCV valve of the prior art system shown in FIG. 7 has three ports 136, 137 and 138 and exhaust port means 139. Port 137 is connected to trailer line 120, port 136 is connected to port 133 of PV by control system line 115. Port 138 is a signal port, connected to line 121 between PV and TOPV by a return line 119. When the TPCV knob is pushed in, ports 136 and 137 open. If there is no pressure from return line 119 to signal port 138, port 137 communicates to exhaust port means 139. If there is pressure from return line 119 to signal port 138, port 136 communicates with port 137 and exhaust port means 139 is closed. When the TPCV knob is pulled out, port 136 is closed and port 137 and exhaust port means 139 are open and communicating.

Referring to Table I, when tractor and trailer are operating on the highway, there must be pressure in the tractor park brake and trailer emergency line to assure that parking emergency brakes are not applied. In order to accomplish this, the TPCV, PV and TOPV are all pushed in. Air from the service reservoir 107 and/or 108 flows through supply line 110 to control system line 115. Where lines 110 and 115 intersect, air flows to port 136 of the TPCV which is pushed in and communicates through the TPCV to port 137 and then to trailer line 120 which communicates to trailer emergency brake line 125. The exhaust port means 139 of the TPCV valve is closed by a pressure signal to port 138. Air from supply line 110 flows to control system line 115 and through open port 133 which communicates to port 134 of the PV valve with exhaust port 135 being closed. High pressure air then flows through line 121 to port 130 of the TOPV and communicates through the TOPV to port 131, the exhaust port 132 of the TOPV being closed. The high pressure air communicates from port 131 to pneumatic brake actuators 117. Air flows from line 121 through return line 119 to signal port 138 causing exhaust port means 139 to remain closed. As indicated in Table I, pressure is applied to the tractor air brakes and the trailer emergency line.

When the tractor and trailer are parked, the PV is pulled out and the TPCV and the TOPV can be either in or out. By pulling the PV out, port 133 closes and exhaust port 135 opens in communication with open port 134. This results in a low pressure signal being sent to port 138 of the TPCV valve and opening of exhaust port means 139. There is no pressure to the pneumatic brake actuators 117 since PV exhaust port is in open communication with the actuators through the TOPV if it is pushed in, or the actuators exhaust through port 132 of the TOPV if it is pulled out.

When the tractor is parked and the trailer system is beginning to fill with air, the PV and TPCV are both pushed in and the TOPV is pulled out. TOPV port 130 is closed and port 131 is open and in communication with open exhaust port 132. This causes the pneumatic brake actuators 117 to be vented through port 131 and exhaust port 132 of the TOPV while the trailer system is being filled with air.

When the tractor is operated bobtail without a trailer on the highway, the PV and TOPV are pushed in and the TPCV is pulled out. The trailer emergency line vents through open TPCV port 137 which communicates with open exhaust port means 139. The PV and TOPV being pushed in results in pressure to the pneumatic brake actuators 117.

When the tractor is operating bobtail and is parked, the TPCV and TOPV are pulled out and the PV can be in or out. The pneumatic brake actuators 117 vent from line 118 through open TOPV port 131 which is in communication with open exhaust port 132. The trailer emergency line vents through open TPCV port 137 which communicates with open exhaust port means 139.

The air parking brake control system of the present invention can accomplish all of the required operational modes of the prior art system shown in FIG. 7 and described above. The system of the present invention is shown in FIG. 8 and uses the TPCV' as illustrated in FIGS. 5 and 6 to replace the TPCV valve and the TOPV. In referring to FIG. 8, corresponding parts in the system of the present invention and the prior art system shown in FIG. 7 have corresponding reference characters. The systems are the same except for the control systems 112 of FIG. 7 and control system 140 of FIG. 8.

The air parking brake control system 140 of the present invention does not contain a TOPV but does contain the same PV as the system of FIG. 7. The PV, as before, has inlet port 133, outlet port 134 and exhaust port 135. The TPCV' has ports 20, 59, 60 and exhaust port 70. Front inlet port 59 is connected to PV inlet port 133 by control system line 115. Air parking brake supply line 110 is connected to control system line 115 between ports 59 and 133. Outlet port 134 of PV is connected to line 118 and communicates with pneumatic brake actuators 117. Return line 141 is connected to line 118, between port 134 and two way check valve 142, and is connected to inlet 20 of the TPCV'. Outlet port 60 of the TPCV' is connected to tractor protection valve 123 by trailer line 120.

Table II indicates the various vehicle operating modes and the corresponding results using the TPCV' of the present invention with the PV valve. The various modes will be described with reference to the valve shown in FIGS. 5 and 6 and the air braking system shown in FIG. 8.

When the tractor and trailer are operating together on the highway, the TPCV' and the PV are both pushed in. Air from service reservoir 107 and/or 108 passes through air parking brake supply line 110 to control system line 115. The air then passes through open port 133 which communicates the PV to open port 134, through line 118 and then to pneumatic brake actuators 117 releasing the brakes. Air enters open front inlet port 59 of the TPCV' and passes through the TPCV' and out of open front outlet port 60, through trailer line 120 and to the trailer emergency line 125. The valve 51 is in the position as shown in FIG. 6 with valve seat 75 seated against back valve seat 73 closing off exhaust port 70. The air pressure within control chamber 57 exerts a downward force, or force in a direction toward the pulse portion 53 of the housing, on shaft 63. The force is large enough to overcome the force exerted by spring 85 which biases the shaft toward the front portion 52 of the housing. Therefore, valve seat 75 is securely seated against back valve seat 73 when there is system pressure in control chamber 57. Pressure within the return line 141 is transmitted to inlet 20 of the TPCV'. Because there is a clearance between the piston extension 33 and the sidewall 17 of the pulse chamber 13, pressure from inlet 20 surrounds the piston and the net force on the extension 33 is zero. Piston means 23 is free to move when subjected to an external force. Piston means 23 exerts no force on the valve stem in these circumstances. Therefore, pressure is supplied to pneumatic brake actuators 117 and to the trailer releasing the brakes.

In the mode in which the tractor and trailer are parked, the PV valve is pulled out. Pulling the knob on the PV valve closes port 133 and opens exhaust port 135 to communicate to open port 134. Air exhausts from the pneumatic brake actuators 117 applying the tractor park brakes. The air from line 118 exhausts through exhaust port 135 causing exhaustion of pressure to be passed through return line 141 to inlet 20. This causes a rapid pressure drop in the front chamber 35 and an inbalance of forces across extension 33 of the TPCV'. The higher pressure below the piston in back chamber 36 forces the piston sharply upward. If the TPCV' has not been pulled out, the force of the piston means 23 moving upward contacts of the shaft back 66 of the shaft 63 and unseats valve seat 75 from back valve seat 73. Spring 85 then cooperates to move shaft 63 toward the front of the valve until valve seat 75 seats against front valve seat 72 as shown in FIG. 5. This blocks the flow from front inlet port 59 and allows the trailer emergency line 125 to exhaust through exhaust port 70 by way of TPCV' front outlet port 60. Exhausting the emergency brake line 125 causes the trailer emergency brakes to be applied.

Since the extension 33 on piston means 23 is in a sliding fit within pulse chamber 13 but not an airtight fit, the high pressure air trapped in back chamber 36 will leak past the extension and, after a predetermined period of time, the pressures across the piston extension 33 and the net forces acting upon it will be zero. The fit of the extension 33 within pulse chamber 13 determines the leak rate and the time required for the pressure to equalize above and below the piston. This time period is therefore a characteristic that can be controlled by the valve designer. In this application, the time during which the piston is applied is about one second.

When a tractor is first coupled to a trailer, it is desirable to hold the tractor parked while the trailer air system is being charged with air. With the three valve systems in the prior art, it is necessary to pull out the TOPV and push in the PV and TPCV. If the driver neglects the TOPV (which is seldom used for any other vehicle operating mode), he will be able to fill the trailer air system, but will find that the vehicle is not parked after the trailer system reaches approximately 60 psi. A dangerous rollaway condition then exists. With the TPCV' of the present invention, charging the trailer air system is accomplished by pushing in the TPCV'. The PV remains pulled out in the parked position. PV port 133 is closed so that no pressure releases pneumatic brake actuators 117. With the TPCV' pushed in, high pressure air communicates from air parking brake supply line 110, to control system line 115, to front inlet port 59, through TPCV', out of open front outlet port 60 to the trailer emergency braking system. Pulse chamber inlet 20 of the TPCV' is not pressurized so piston means 23 does not influence the operation of shaft 63. To fill the trailer system with air while maintaining the tractor in the parked position, it is merely necessary to push in the TPCV'.

When the tractor is parked and the operator is ready to unpark the vehicle, the sequence of operating the TPCV' and the PV is not critical but the response within the TPCV' to the pressure pulse from the PV, through return line 141, is slightly different if the TPCV' is operated first than if it is operated after the PV. If the TPCV' knob is pushed in before the PV knob, piston means 23 is positioned so that an inrush of air at inlet 20 drives the piston means 23 toward the back 16 of the pulse chamber. If the PV is pushed in first, the inrush of air at inlet 20 momentarily holds piston means 23 toward the front 15 of pulse chamber 13. It is then necessary to allow this pressure to equalize above and below piston means 23 before the TPCV' can be pushed in. Again this delay is a feature of design and it can typically be in the order of one second or less. In either case, both valves must be manually operated, and once operated stay in their proper positions.

When a tractor is operated without a trailer, i.e., in a bobtail mode, on the highway, the PV is pushed in causing the pneumatic brake actuators 117 to be pressurized and the TPCV' is pulled out closing front inlet port 59 and allowing front outlet port 60 to be in communication with exhaust port 70. The tractor braking system is thereby closed off from the trailer line 120 which vents through exhaust port 70.

When a tractor is operated without a trailer and is parked, the TPCV' remains pulled out as before and the PV is pulled out. The pneumatic brake actuators 117 vent through exhaust port 135 which is opened and in communication with open port 134, thereby applying emergency parking brakes with the trailer line 120 venting through exhaust port 70.

The TPCV' also functions automatically to satisfy the "towing vehicle protection system" requirements of the FMVSS121. Geometric area differentials in the shaft 63 result in the shaft 63 being forced toward the pulse chamber so that valve seat 75 seats on back valve seat 73 until the pressure in control chamber 57 drops below a predetermined value. A loss of air pressure in the towed vehicle causes a lowering of pressure to front outlet port 60 and front inlet port 59 of the TPCV'. This lessens the pressure in control chamber 57. When the air pressure reaches a preselected level, preferably in the range of 30 to 40 psi, spring 85 forces shaft 63 toward the front or upwards unseating valve seat 75 from back valve seat 73 and reseating valve seat 75 against front valve seat 72. This closes the front inlet port 59 satisfying requirements of the law and also exhausts the trailer emergency line which applies the trailer emergency parking brakes. The pressure level which the TPCV' trips is a characteristic which is controlled by the valve designer.

The proposed TPCV' is a simple construction which operates with a conventional tractor-trailer PV and replaces a conventional TPCV and makes the TOPV unnecessary. It relies on a unique pulse valve operated in the pulse portion of the housing. The piston means 23 responds to pressure signals from the PV by producing an impulse or pulse force which forces shaft 63 momentarily toward the front of the valve 51 and then subsides allowing manual positioning regardless of the position of shaft 63. This function insures that both valves will always move to the exhaust position whenever the tractor-trailer PV is moved to a park position. This action is automatic, but is only temporary. The driver has the ability to manually position shaft 63 without interference from the pulse piston means 23 once the impulse has subsided.

Modifications, changes, and improvements to the preferred forms of the invention herein disclosed, described and illustrated may occur to those skilled in the art who come to understand the principles and precepts thereof. Accordingly, the scope of the patent to be issued hereon shold not be limited to the particular embodiments of the invention set forth herein, but rather should be limited by the advance of which the invention has promoted the art.

What is claimed is:

1. A pulse valve which is adapted to a device for moving a part thereof, comprising:
    a pulse housing having a pulse chamber with a longitudinal axis, the pulse chamber having a front, a back and a sidewall, there being a piston opening through the housing at the front of the chamber;
    a piston means reciprocable in the pulse chamber along the axis thereof, the means having a piston portion slidingly passing through the piston opening, the piston portion having a piston sidewall, a front end and a back end, the piston portion being longer than the distance from the front to the back of the pulse chamber, and the piston means having an extension from the piston sidewall toward the chamber sidewall, the extension being within the pulse chamber and transversely dividing the pulse chamber into a pair of smaller chambers separated by the extension, one of the ends of the piston portion adapted to engage and move the part of the device when the extension correspondingly moves in the pulse chamber in the direction of the part;
    an inlet disposed in the pulse housing and communicating with at least one of the smaller chambers, and through which gas is circulated to the at least one of the chambers; and
    means for allowing the circulation of gas between the smaller chambers to equalize a force suddenly exerted against the extension by a differential gas pressure in the smaller chambers.

2. The pulse valve as recited in claim 1 further comprising a sealing means between the piston portion and the piston opening.

3. The pulse valve as recited in claim 2 wherein: the piston portion is a cylindrical piston; the piston opening is cylindrically shaped to slidingly receive the piston portion; the extension is cylindrical and coaxial with the piston means; the pulse chamber sidewall is cylindrical; and the means for allowing the circulation of gas between the smaller chambers include clearance between the extension and an adjacent front, back or sidewall of the pulse chamber sufficient to allow the circulation of gas around the extension between the smaller chambers.

4. The pulse valve as recited in claim 3 wherein the extension is located at the back end of the piston portion and further comprises a lip protruding toward the back of the pulse chamber, the lip having a diameter no greater than the extension.

5. The pulse valve as recited in claim 4 wherein the inlet is located above the extension when the piston means is located so that the lip intercepts the back of the pulse chamber.

6. The pulse valve as recited in claim 3 further comprising: an auxiliary back chamber, the auxiliary back chamber being within the back of the housing and communicating with the back chamber, a stop means to prevent the extension from sliding into the auxiliary back chamber.

7. The pulse valve as recited in claim 3 further comprising: an auxiliary front chamber being within the front of the housing and communicating with the front chamber, a stop means to prevent the extension from sliding into the auxiliary front chamber.

8. The pulse valve as recited in claim 3 further comprising an extension front face, an extension back face and a biasing means to compensate for unequal forces resulting from equal areas of the extension front face and the extension back face.

9. The pulse valve as recited in claim 8 wherein the back face has a greater area than the front face and the biasing means is a spring between the extension and the front of the pulse chamber.

10. The pulse valve as recited in claim 3 further comprising a back end extension of the piston portion slidingly passing through a back end extension opening in the pulse housing.

11. The pulse valve as recited in claim 10 further comprising a sealing means between the back end extension and the back end extension opening.

12. The pulse valve as recited in claim 11 further comprising an external passage between the front chamber and the back chamber.

13. The pulse valve as recited in claim 12 wherein the external passage is a channel in the pulse housing, and which further comprises a means to control the amount the passage is open.

14. The pulse valve as recited in claim 13 wherein the means to control the amount the passage is opened is a needle valve.

15. The pulse valve as recited in claim 14 further comprising a sealing means between the extension and the pulse chamber sidewall.

16. The pulse valve as recited in claim 11 further comprising a hole between the front chamber and the back chamber in the extension.

17. The pulse valve as recited in claim 16 further comprising a sealing means between the extension and the pulse chamber sidewall.

18. The pulse valve as recited in claim 17 wherein the inlet is located above the extension when the extension intercepts the back of the pulse chamber further comprising an imperfect check valve in the hole between the front chamber and the back chamber, the imperfect check valve allowing flow from the front chamber to the back chamber and a controlled limited flow from the back chamber to the front chamber.

19. The pulse valve as recited in claim 17 wherein the inlet is located above the extension when the extension intercepts the back of the pulse chamber further comprising a perfect check valve in the hole between the front chamber and the back chamber, the perfect check valve only allowing flow from the front chamber to the back chamber; a notch in the sidewall of the chamber at a predetermined distance from the front of the chamber so that the movement of the piston means toward the front of the chamber results in the notch lapping the seal means and opening a passage between the front and back chambers through the notch.

20. A manual control valve comprising:
a housing having a front portion and a pulse portion;
a manual activation means whereby the control valve can be manually operated;
a control chamber in the housing between the front portion and the pulse portion of the housing;
a front inlet port into the front portion of the housing communicating with the control chamber;
a front outlet port from the front portion of the housing communicating with the control chamber;
a back port from the pulse portion of the housing communicating with the control chamber;
a shaft bore communicating through the front portion of the housing;
a shaft slidingly located within the shaft bore, the shaft having a front end and back end, the front end being operatively connected to the manual activation means, the back end passing into the control chamber;
a sealing means between the shaft and the shaft bore;
a front valve seat located between the front inlet port and the control chamber;
a back valve seat located between the back outlet port and the control chamber;
a valve seating means connected to the shaft within the control chamber whereby the shaft can move toward the front portion until the valve seating means seats on the front valve seat and prevents communication between the front inlet port with the control chamber, and the shaft can move toward the pulse portion until the valve seating means seats on the back valve seat and prevents communication between the back outlet port with the control chamber;
a pulse chamber in the pulse portion of the housing, the pulse chamber having a front, a back and a pulse chamber sidewall, there being an inlet through the housing to the pulse chamber and a piston opening through the front end of the pulse chamber and into the control chamber coaxial with the shaft;
a piston means having a piston portion slidingly passing through the piston opening, the piston portion having a piston sidewall, a front end and a back end, and the piston portion being longer than the distance from the front to the back of the pulse chamber, and the piston means having an extension from the piston sidewall toward the pulse chamber sidewall, the extension being within the pulse chamber, and there being a predetermined clearance area between the chamber sidewall and the extension, the pulse chamber being divided into a front pulse chamber and a back pulse chamber by the extension, there being sufficient distance between the front end of the piston means and the extension so that when the piston means slides toward the front of the pulse chamber the front end of the piston protrudes into the control chamber past the location which the back end of shaft must be located for the seating means to seat on the back valve seat.

21. The manual control valve as recited in claim 20 further comprising a sealing means between the pulse piston means and the piston opening.

22. The manual control valve as recited in claim 21 wherein: the piston means is a cylindrical piston; the piston opening is cylindrically shaped to slidingly receive the piston; the extension is cylindrical and coaxial with the piston; the pulse chamber sidewall being cylindrical and having a diameter greater than the diameter of the extension whereby the extension can slide within the pulse chamber.

23. The manual control valve as recited in claim 22 further comprising:
a back end pulse piston opening in the back of the housing;
a back end piston extension slidingly passing through the back end piston opening;
a means to seal between the back end piston extension and the back end pulse section opening.

24. The manual control valve as recited in claim 23 wherein the extension is located at the back end of the piston and further comprises a lip protruding toward the back of the pulse chamber, the lip having a diameter no greater than the extension.

25. The manual control valve as recited in claim 24 wherein the inlet is located above the extension where the piston is located so that the lip intercepts back of the pulse chamber.

26. The manual control valve as recited in claim 23 further comprising: an auxiliary back chamber, the auxiliary back chamber being within the back of the housing and communicating with the chamber; a stop means to prevent the extension from sliding into the auxiliary back chamber.

27. The manual control valve as recited in claim 23 further comprising: an auxiliary front chamber, the auxiliary front chamber being within the front of the housing and communicating with the chamber; a stop means to prevent the extension from sliding into the auxiliary back chamber.

28. The manual control valve as recited in claim 23 further comprising: an external passage between the front chamber and back chamber; a means to control the amount the passage is open whereby the duration of a pressure difference between the front pulse chamber and back pulse chamber can be controlled.

29. The manual control valve as recited in claim 28 further comprising a sealing means between the extension and the pulse chamber sidewall.

30. The manual control valve as recited in claim 23 further comprising a hole between the front chamber and the back chamber in the extension.

31. The manual control valve as recited in claim 30 further comprising a sealing means between the extension and the pulse chamber sidewall.

32. The manual control valve as recited in claim 31 wherein the inlet is located above the extension when the extension intercepts the back of the pulse chamber further comprising an imperfect check valve in the hole between the front chamber and the back chamber, the imperfect check valve allowing flow from the front chamber to the back chamber and a controlled limited flow from the back chamber to the front chamber.

33. The manual control valve as recited in claim 23 further comprising a means to bias the shaft toward the front of the housing.

34. The manual control valve as recited in claim 33 wherein the biasing means is a spring which forces the shaft to the front when the inlet fluid pressure to control chamber decreases below a given value.

35. An air parking brake control system for an air parking brake system comprising:
a means to supply compressed air; tractor pneumatic brake actuators; trailer pneumatic brake actuators;
a tractor-trailer park control valve (PV) having an inlet port, an outlet port and an exhaust port;
a tractor protection control valve (TPCV') further comprising,
a housing having a front portion and a pulse portion;
a manual activation means whereby the control valve can be manually operated;
a control chamber in the housing between the front portion and the pulse portion of the housing;
a front inlet port into the front portion of the housing communicating with the control chamber;
a front outlet port from the front portion of the housing communicating with the control chamber;
an exhaust port from the pulse portion of the housing communicating with the control chamber;
a shaft bore communicating through the front portion of the housing;
a shaft slidingly located within the shaft bore, the shaft having a front end and back end, the front end being operatively connected to the manual activation means, the back end passing into the control chamber;
a sealing means between the shaft and the shaft bore;
a front valve seat located between the front inlet port and the control chamber;
a back valve seat located between the exhaust port and the control chamber;
a valve seating means connected to the shaft within the control chamber whereby the shaft can move toward the front portion until the valve seating means seats on the front valve seat and prevents communication between the front inlet port with the control chamber, and the shaft can move toward the pulse portion until the valve seating means seats on the back valve seat and prevents communication between the exhaust port with the control chamber;
a pulse chamber in the pulse portion of the housing, the pulse chamber having a front, a back and a pulse chamber sidewall, there being an inlet through the housing to the pulse chamber and a piston opening through the front end of the pulse chamber and into the control chamber coaxial with the shaft;
a piston means having a piston portion slidingly passing through the piston opening, the piston portion having a piston sidewall, a front end and a back end, and the piston portion being longer than the distance from the front to the back of the pulse chamber, and the piston means having an extension from the piston sidewall toward the pulse chamber sidewall, the extension being within the pulse chamber, and there being a predetermined clearance area between the chamber sidewall and the extension, the pulse chamber being divided into a front pulse chamber and a back pulse chamber by the extension, there being sufficient distance between the front end of the piston means and the extension so that when the piston means slides toward the front of the pulse chamber the front end of the piston protrudes into the control chamber past the location which the back end of the shaft must be located for the seating means to seat on the back valve seat;
a control system line connecting the PV inlet port to the TPCV' front inlet port;
a supply line communicating from the means to supply compressed air to the control system line;
a brake line from the PV outlet port communicating to tractor pneumatic brake actuators;
a return line connecting the brake line to the pulse chamber inlet of the TPCV';
a trailer line from TPCV' front outlet port communicating to the trailer pneumatic brake actuators.

36. The air parking brake control system as recited in claim 35 further comprising a sealing means between the pulse piston means and the piston opening.

37. The air parking brake control system as recited in claim 36 wherein: the piston means is a cylindrical piston; the piston opening is cylindrically shaped to slidingly receive the piston; the extension is cylindrical and coaxial with the piston; the pulse chamber sidewall being cylindrical and having a diameter greater than the diameter of the extension whereby the extension can slide within the pulse chamber.

38. The air parking brake control system as recited in claim 37 further comprising:
a back end pulse piston opening in the back of the housing;
a back end piston extension slidingly passing through the back end piston opening;
a means to seal between the back end piston extension and the back end pulse section opening.

39. The air parking brake control system as recited in claim 38 further comprising: an external passage between the front chamber and back chamber; a means to control the amount the passage is open whereby the duration of a pressure difference between the front pulse chamber and back pulse chamber can be controlled.

40. The air parking brake control system as recited in claim 38 further comprising a hole between the front chamber and the back chamber in the extension.

41. The manual control valve as recited in claim 36 further comprising a means to bias the shaft toward the front of the housing.

42. The air parking brake control system as recited in claim 41 wherein the biasing means is a spring which forces the shaft to the front when the inlet fluid pressure to control chamber decreases below a given value.

43. A valve which is adaptable to a device for moving a part thereof, comprising:
(a) a housing having a chamber with a longitudinal axis;
(b) a gas impervious member reciprocable in the chamber along the axis thereof, the member being generally in a plane which is normal to the axis to transversely divide the chamber into a pair of smaller chambers separated by the member;
(c) an inlet disposed in the housing and communicating with at least one of the smaller chambers, and through which gas is circulated to the at least one of the chambers;
(d) means coupled to the member and movable, in unison, therewith to engage and move the part when the member correspondingly moves in the direction of the part;
(e) means for allowing the circulation of gas, under pressure, between the smaller chambers to equalize a force suddenly exerted against the member in one of the smaller chambers by differential gas pressure in the smaller chambers.

44. The valve of claim 43, wherein the gas impervious member and the part engaging and moving means include, a dual diameter piston having a larger diameter cylindrical portion which is in the chamber and attached to at least one smaller diameter cylindrical portion which extends out of the chamber and is coaxially aligned with the larger diameter portion.

45. The valve of claim 44, wherein the means for allowing the circulation of gas between the smaller chambers include clearance between the larger diameter piston portion and adjacent wall of the pulse chamber sufficient to allow circulation of gas between the smaller chambers.

46. The valve of claim 44, wherein the means for allowing the circulation of gas between the smaller chambers include, a fluid passageway extending through the larger piston portion between the smaller chambers, and means for preventing circulation of gas through the fluid passageway from the smaller chamber not in communication with the inlet, when the pressure in said non-communicating smaller chamber is greater than the pressure in the other of the smaller chambers.

47. The valve of claim 44, wherein the means for allowing the circulation of gas between the smaller chambers include, a fluid passageway formed in the housing between the smaller chambers, and means for varying the flow of gas in the fluid passageway.

* * * * *